United States Patent [19]

Astle

[11] Patent Number: 4,698,682
[45] Date of Patent: Oct. 6, 1987

[54] VIDEO APPARATUS AND METHOD FOR PRODUCING THE ILLUSION OF MOTION FROM A SEQUENCE OF STILL IMAGES

[75] Inventor: Brian Astle, Middlesex County, N.J.

[73] Assignee: RCA Corporation, Princeton, N.J.

[21] Appl. No.: 836,413

[22] Filed: Mar. 5, 1986

[51] Int. Cl.$^4$ ............................................. H04N 5/262
[52] U.S. Cl. ....................................... 358/182; 358/22
[58] Field of Search .................. 358/182, 183, 185, 22

[56] References Cited

U.S. PATENT DOCUMENTS

| | | | |
|---|---|---|---|
| 3,598,908 | 8/1971 | Poulett | 358/182 |
| 4,001,498 | 1/1977 | Morishita et al. | 358/160 |
| 4,130,830 | 12/1978 | Derickoon | 358/22 |
| 4,214,263 | 7/1980 | Kaiser | 358/22 |
| 4,223,351 | 9/1980 | Tshuimura | 358/182 |
| 4,233,631 | 11/1980 | Mahler | 358/182 |
| 4,356,511 | 10/1982 | Tsujimura | 358/181 |
| 4,572,506 | 2/1986 | Diorio | 358/22 |

Primary Examiner—Tommy P. Chin
Attorney, Agent, or Firm—Joseph S. Tripoli; Allen LeRoy Limberg

[57] ABSTRACT

An apparatus is provided for use with a computerized graphics system to create the illusion of motion from a sequence of still images. A memory and circuitry are provided to generate video signals representing successive still images in the motion sequence. The transition from still image to still image in the sequence is provided by dissolving from the presently displayed image to the next image. This dissolve eliminates the jerkiness that is usually present in creating motion from two images having rather large pixel size by smoothing over the transition from one still image to the next.

12 Claims, 4 Drawing Figures

VIDEO APPARATUS AND METHOD FOR PRODUCING THE ILLUSION OF MOTION FROM A SEQUENCE OF STILL IMAGES

The present invention relates to video circuitry for producing a moving image from a plurality of still images, and particularly to such circuitry for use with computer generated still images.

BACKGROUND OF THE INVENTION

It is well known since before the days of motion pictures that one can create the illusion of a moving image by the display of a rapid succession of still images. This technique is used not only in motion pitures but also in television. Motion pictures and television images are generated by a "hard" switch between frames of the moving image from one still image to the next. This illusion of motion created by a rapid sequence of still images is also used in the computer graphic arts whereby the computer generates a plurality of digital still images which are stored in memory to be later converted into a sequence of video frames.

Occasionally the image of one scene of a television program may be dissolved into that from another scene by fading out the first scene and fading in the second scene. However, this dissolve typically takes place over several frame intervals with the images in each scene continuning to change during the dissolve.

A number of problems exist with the creation of an illusion of motion from a sequence of computer generated still images. Typically the graphics images has a relatively coarse resolution because the picture elements (pixels) are relatively large in size as compared to pixels of a conventional NTSC video image. Although high resolution system with very small, imperceptible pixels are available, their expense makes them impractical for many applications. The pixels have fixed locations and as an object moves either horizontally or vertically from one still image to the next, the object must move in a minimum increment of a single pixel. Depending upon the size of the pixels and the speed at which the still images change, the movement may be perceived as being jerky with a flicker in the simulated motion. The motion will appear more jerky as the number of separate still images displayed per second drops, and with larger pixel size display systems. For example, motion pictures are conventionally shot at 24 frames per second. However, the shutter on the projector operates at 48 frames per second displaying each frame twice to reduce the frame to frame flicker (or motion aliasing).

Two obvious approaches to solving the problem of jerkiness in the moving image would be to (1) decrease the pixel size or (2) increase the rate at which the still images are displayed. Decreasing the size of the pixel increases the number of pixels in the image necessitating a dramatic increase in the amount of memory required to store each still image and the amount of computing power necessary to generate each image. Very small pixel sizes are often impractical from an economic standpoint. If one is to increase the image display rate, a larger number of still images will have to be displayed within a given period of time thereby also necessitating increased memory size and computing capabilities. In some instances, especially those involving computer games, the human operator is given control over the speed of the motion. In this case the number of frames per second cannot be predetermined and the only obvious solution is to decrease the pixel size.

This jerkiness problem can also be addressed by the software that generates the sequence of images. However, this approach costs computing time which could be better spent in creating more complex or natural appearing images.

SUMMARY OF THE INVENTION

An apparatus is provided for producing the illusion of motion from a sequence of still images, typically those generated by a computer graphics system. A source of a plurality of still images representing the segments of sequence of motion to be displayed is provided. Circuitry is also included for sequentially dissolving from one still image of said sequence to the next still image at every transition between still images. A device is provided for controlling the access to the stored data and the dissolving from one image to the next.

DETAILED DESCRIPTION OF THE PREFERRED EMBODIMENTS

Figure 1:
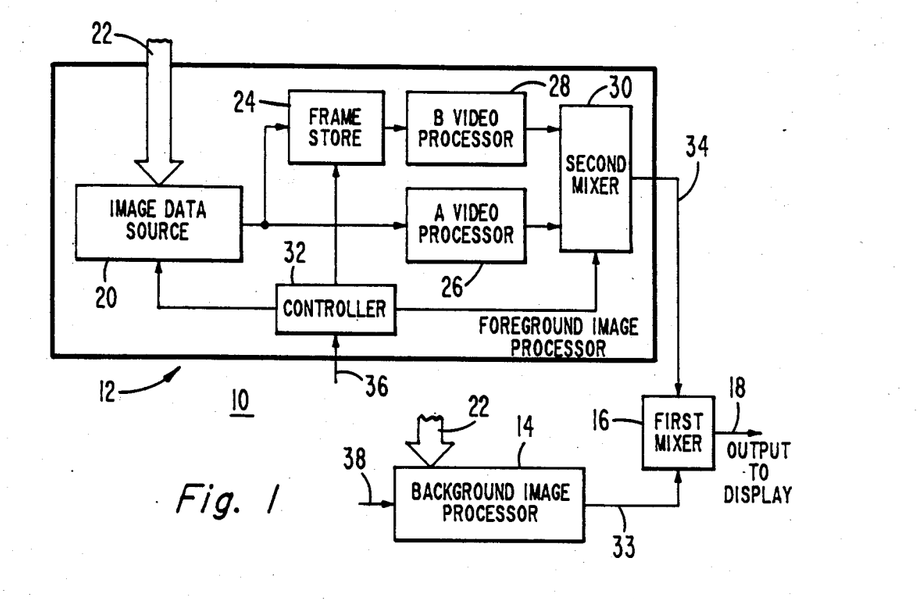
FIG. 1 is a schematic block diagram of one embodiment of the present invention.

With initial reference to FIG. 1, a video graphics system 10 for a computer includes a foreground image processor 12 and a background image processor 14 which generate respectively a foreground video signal and a background video signal. The background image processor 14 generates video signal describes a background scene against which objects described by the foreground video signal may be superimposed in a montage video signal, or composite-image video signal, generated by a first mixer 16 receptive of the foreground and background video signals as input signals. For example, if the processor 10 was being used to generate the video image for a computer game such as Asteriods, the background image processor 14 would produce a background video signal on line 33 representing the image of outer space with stars and planets. This background scene may remain relatively stationary from frame to frame in the overall game display. For ease of explanation, the present invention will be described in terms of a non-interlaced video signal in which each video image frame is represented by a single raster scan. However this invention could be adapted for use with an interlaced video signal.

The foreground image processor 12 produces the objects or sprites, representing for example the asteroids spaceships and the player's gun sight, which are apt to move from frame to frame during the video game. The first mixer 16 takes the foreground video signal supplied from the foreground image processor 12 and superimposes the objects contained in that video signal into or over the background scene by replacing the background video signal from the background image processor 14 to produce a montage, or composite-image, video signal on output line 18.

The foreground image processor 12 consists of an image data source 20, such as a memory which stores a plurality of still images representing one or several sequences of motion. Alternatively, the source 20 of still images could be a compact disk player, a dedicated micro-engine image processor capable of generating the image data in real time, or a video tape or disk player. In the case where the image source 20 is a memory, the data for each of the still images is received from the computer (not shown) over a data bus 22. The output of the image data source 20 is fed to a frame store 24 and to an A video processor 26. As the image data source 20 can supply data for only one image of the sequence at a time, the frame store 24 provides temporary storage of one image during the transition between consecutive images in the motion sequence. The output of the frame store is in turn fed to a B video processor 28.

The A and B video processors take the data from the image data source which is typically in a digital format and convert it to separate video signals representing the images formed by said data. Both processors 26 and 28 produce video signals that are in synchronism. The signal outputs from the A and B video processors are coupled as separate inputs to a second video mixer 30. The second mixer 30 provides a dissolve from one video processor's output to the other, rather than a "hard" switch between the video processor outputs. The output of the second mixer represents the output signal from the foreground image processor 12 which is coupled over line 34 to an input of the first mixer 16. The image data source 20, frame store 24 and the second mixer 30 are governed by a processor controller 32 which receives direction from the computer over line 36.

Figure 4:
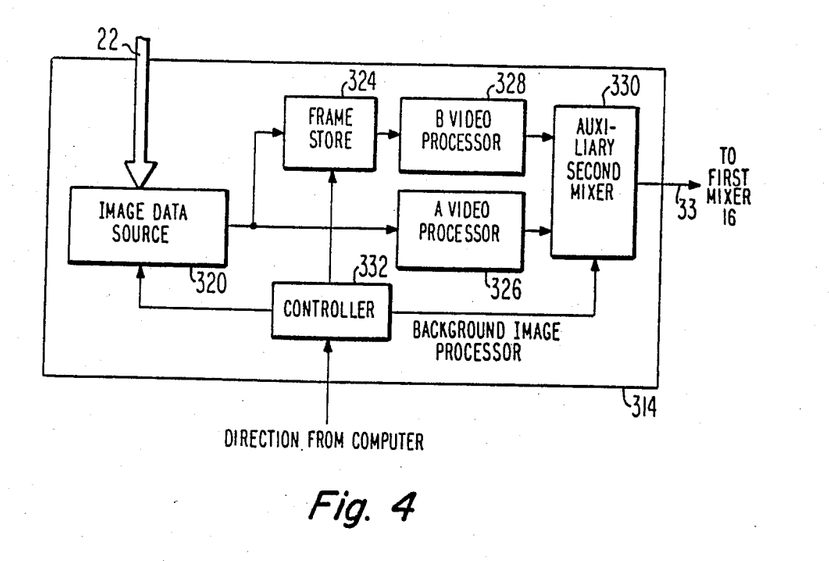
FIG. 4 is a schematic block diagram of a form that the background image processor in FIG. 1 takes in certain further embodiments of the invention.

The background image processor 14 can be a conventional image processor containing an image data source whose output is fed directly to a video processor to produce a background video signal for the first mixer 16. The background processor 14 also receives data and control signals from the computer over lines 22 and 38, respectively. Alternatively, if the background scene is apt to contain frequent movement similar to that in the foreground image, the background image processor 14 can be a background image compressor 314 as shown in FIG. 4 which contains circuitry identical to that of the foreground image processor 12. Elements in background image processor 314 bear identification numbers formed from the prefix digit 3 followed by suffix digits corresponding to those identifying similar elements in the foreground image processor 12 of FIG. 1, to which FIG. 1 the attention of the reader should now be again directed.

As noted above, the video system 10 may be incorporated as a part of a graphics system in a larger computer. In this case, the data representing the images to be displayed are generated by the computer and fed on bus 22 to the foreground and the background image processors 12 and 14 respectively. The following description assumes that the background image remains static and only the foreground image changes.

The foreground image data is stored in the source memory 20 in much the same manner as image data is stored in conventional computer systems. When a sequence of images is to be displayed depicting a moving scene, controller 32 generates a signal to the memory 20 which feeds the foreground data for the first still image of the sequence into frame store 24 which also receives a signal from controller 32. The foreground image data is temporarily stored in frame store 24 and at the same time is sent to the B video processor 28 to generate a video signal representing the first still image. The second mixer 30 also receives a signal from controller 32 instructing it to feed the signal from the B video processor 28 to output line 34 coupled to the first mixer 16.

At this point in time, the background portion of the overall image is being fed from the background image processor 14 to the other input of the first mixer 16. The first mixer forms a montage, or composite-image, video signal on output line 18 in which the objects in the image from the foreground image processor 12 are superimposed over the background image from the background processor 14. The first composite image continues to be processed for generating a montage video signal fed on output line 18 until such time as the computer instructs controller 32 via control line 36 to display the next image in the motion sequence. The first composite image may be produced for any length of time, from one frame interval to several seconds or more.

When the second still image of the sequence is to be displayed, new foreground still image data is fed from memory 20 directly to the A processor 26 to create a video signal representing the second foreground image. The second image foreground video signal is in turn coupled to another input of the second mixer 30.

The second image of the sequence is typically much the same as the first image with the objects therein being slightly changed in position or appearance to represent the next still image in the motion sequence of those objects. The data for the second foreground image is repetitively fed from the memory 20 to the A video processor 26 during each video frame period. The second mixer 30 upon receipt of a control signal from controller 32 begins a dissolve from the B video processor signal to the video signal from the A video processor. The rate of the dissolve may be fixed or variable under computer control to occur over one or more video frame periods. At the end of the dissolve period the output signal from the foreground image processor 30 is solely from the A video processor 26.

At the end of the dissolve, when the output signal from the foreground processor 12 is solely from the A video processor, the data for the second image may be stored in the frame store 24. Upon this storage the signals from both video processors 26 and 28 represent the second foreground still image. At some point in time thereafter, typically during one of the vertical retrace intervals of the video signal, the source of the video for the second foreground image is switched by the second mixer 30 to the B video processor 28 under the direction of controller 32. The data for the second image is now being fed from the frame store 24 to the B video processor 28 to generate the foreground video signal.

After this switch in sources for the second still image, a transition to the third still image of the motion sequence may occur by the controller 32 sending data for the third foreground image from memory 20 to the A video processor 26. The second mixer 30 then is instructed to dissolve to the third video image in much the same way as the dissolve occurred from the first to the second image. This sequence is then repeated for each transition from one still image to the next in the motion sequence with a dissolve occurring at every transition.

The process employed in the foreground image processor 12 may be varied slightly from the previously described. For example, when the video is being supplied solely by the A video processor 26, the data for the next foreground image of the sequence may be fed, during the vertical trace interval, from memory 20 to frame store 24. In this alternative, the frame store 24 and the B video processor 28 provide the signal source for the next image of the sequence and the second mixer 30 dissolves from the A video processor 26 to the B video processor 28. In this case when the third still image is to be displayed, the data is fed directly from the image data memory 20 to the A video processor 26 and a transition occurs from the B video processor to the A video processor signals.

Figure 2:
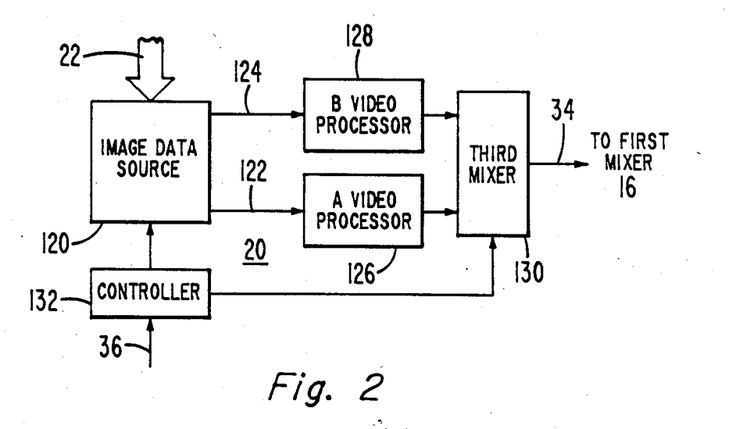
FIG. 2 is an alternate embodiment for the image processors of FIG. 1.

An alternative embodiment of the circuitry for the foreground image processor 12 in FIG. 1 is shown in FIG. 2. The major difference between the embodiments shown in the two figures is that the image data source 120 of FIG. 2 has first and second data output ports 122 and 124, respectively. The source 120 may comprise a single memory structure having two different output ports each of which capable of simultaneously addressing any portion of the entire memory, or alternatively, the source 120 may comprise two separate banks each feeding one of the output ports 122 or 124. In this latter instance, alternate still images of the sequence would be stored in each memory bank. For example, if the still images of a sequence were given integer numbers, the off numbered still images would be stored in the one bank and the even numbered still images of the sequence would be stored in the other bank.

The first output port 122 is coupled as an input to the A video processor 128 to generate a first video signal which is fed to one input of a third mixer 130. The second output port 124 is coupled to the input of a B video processor 126 to generate a second video signal which is fed to the other input of a third mixer 130. The third mixer 130 is identical to the second mixer 30 and produces the output signal for the image processor 20 on line 34. A controller 132 receives instructions from the computer over line 36 and generates control signals for the image data memory 120 and the third mixer 130.

During the operation of the embodiment shown in FIG. 2, data for the first still image will be supplied from the memory to the A video processor 128 via the first output port 122. The A video processor 128 will generate a video signal which will be fed through the third mixer 130 to the output line 34. When the computer instructs the image processor 20 to change to the second still image, the image data memory 120 feeds the second still image to the B video processor 128 simultaneously with the feeding of data for the first image via port 122. The two video processors 126 and 128 simultaneously feed the video signals representing the first and second still images to the third mixer 130. The controller 132 instructs the third mixer 130 to dissolve from the A video processor signal to the B video processor signal. Once the dissolve is complete the output video signal on line 34 will come solely from the B video processor 126 and comprise the second image of the motion sequence.

When the third image for the motion sequence is to be generated, the data for that image is supplied from the memory 120 to the A video processor 128. Data for the second video image is still being fed via output port 124 to the B video processor 128 at this time. In order to accomplish the transition from the second to the third still image, the controller 132 instructs the third mixer 130 to dissolve from the B video processor signal to the signal from the A video processor. Once the dissolve is complete, the output signal on line 34 is coming solely from the A video processor 126. The data for the next still image in the motion sequence may be supplied from the memory 120 to the B video processor 128 via the second port 124. This sequence of alternating the still images from the A or the B video processors continues until the entire sequence of motion is complete.

Figure 3:
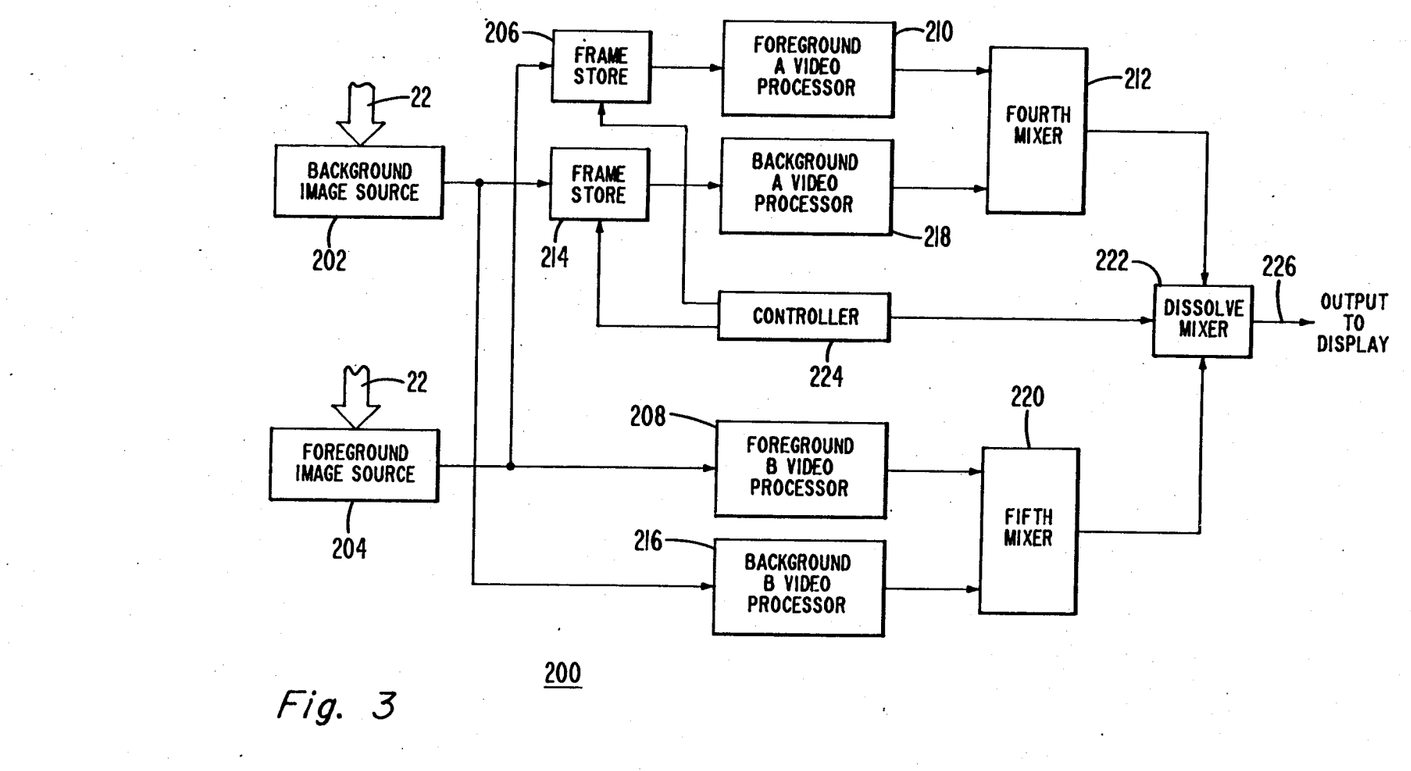
FIG. 3 is a schematic block diagram of another embodiment of the present invention.

In the above descriptions of the apparatus operation, it has been assumed that the background image has remained static. However, that portion of the output image may also change in the simplest sense by a "hard" switch between the two background scenes during a vertical retrace interval. As noted above, in an alternative embodiment of the apparatus 10 the background image processor 14 could be similar to the foreground image processor 12 or 20 so as to create an illusion of smooth motion by a dissolve between background still images. The operation of such a background image processor 14 would be identical to that of the foreground image processor 12 or 20, of course dealing with different still images and providing transitions at different times The superimposing of the foreground imagery over the background imagery, by replacing portions of the background video signal by portions of the foreground video signal to generate a montage video signal may occur prior to the interframe dissolver (i.e., the second mixer 30, FIG. 1). With reference to FIG. 3, such a system 200 is shown comprising a background and a foreground image source 202 and 204, respectively. The output of the foreground image source 204 is coupled to a second frame store 206 and to a foreground B video processor 208. The output of the second frame store 206 is coupled to the input of a foreground A video processor 210 whose output is coupled to one input of fourth mixer 212.

The output of the background image source 202 is connected to a third frame store 214 and to a background B video processor 216. The output of the third frame store 214 is connected to the input of a background A video processor 218 whose output is connected as the other input to the fourth mixer 212. A fifth mixer 220 has one input connected to the output of the foreground B video processor 208 and another input connected to the background B video processor 216. The output of the fifth mixer 220 is coupled as one input to a dissolve mixer 222, which is similar to the second mixer 30 in FIG. 1. The other input of the dissolve mixer 222 is coupled to the output of the fourth mixer 212. The fourth and fifth mixers 212 and 220 superimpose the image from their respective foreground processor over the image from their respective background video processor.

Controller 224 provides control signals to each of the frame stores 206 and 214 as well as the dissolves mixer 222.

During the course of the operation of the embodiment in FIG. 3, the foreground portion of the first image in the sequence is sent from the foreground image source 204 to the first frame store 206. Simultaneously the background portion of the first image in the sequence is supplied from the background image source 202 to the second frame store 214. Under the supervision of controller 224 the foreground and background portion of the first still image are fed out of the first and second frame stores 206 and 214, respectively. The foreground and background A video processors 210 and 218 produce video signals corresponding to the respective foreground and background portions of the first still image. The fourth mixer 212 substitutes portions of the foreground video signal from the foreground A video processor 210 for the background video signal from the background A video processor 218 to form a montage, or composite-image, video signal descriptive of the first image in the sequence. The dissolve mixer 222 passes this montage video signal to its output 226.

When the next image in the sequence is to be displayed, the background image source 202 supplies the data for that image to the background B video processor 216 simultaneously with the foreground image processor 204 supplying the corresponding foreground data to the foreground B video processor 208. The fifth mixer 220 substitutes portions of the foreground video signal from the foreground B video processor for the background video signal from the background B video processor to create a a montage video signal descriptive of a second composite image. Controller 224 then instructs the dissolve mixer 222 to cross fade from the video signal from the fourth mixer 212 representing the first image in the sequence to the video signal from the fifth mixer 220 representing the second image in the sequence.

After that dissolve is complete the next image in the sequence may be displayed. The data for that image is then fed, during a vertical retrace interval, from the respective background and foreground image source 202 and 204 to the corresponding frame store 206 and 214. The composite video signal for the third image in the sequence is then generated in a manner similar to that which was used to generate the first image in the sequence. The embodiment in FIG. 3 is similar to that in FIG. 1 except the foreground and background video signals descriptive of each still image are combined to form a montage video signal descriptive of the composite image prior to the circuitry which dissolves from one image to the next at each frame transition.

With the present invention, because the transition from one still image to the next in the sequence motion is provided by a dissolve rather than a "hard" switch, as is currently the practice, the jerky motion normally seen with relatively coarse pixel sizes it smoothed over by the dissolved transition. The illusion of motion generated by a sequence of still images processed according to the present apparatus is much more life-like than conventional graphic systems which have a "hard" switch from one still image to the next. This improved illusion of motion is accomplished without decreasing the pixel size or speeding up the frame rate of the motion sequence.

What is claimed is:

1. Apparatus for generating a montage video signal providing an illusion of continuous motion from sequences of related discontinuous still images, said apparatus comprising:
    a source of first sequences of related discontinuous still images;
    a source of other still images unrelated to said first sequences of still images;
    a first mixer for generating said montage video signal at an output port thereof responsive to first and second component video signals applied respectively to a first input port thereof and to a second input port thereof;
    a first image processor for generating said first component video signal responsive to said first sequences of still images, said first image processor consecutively considering successive pairs of each said first sequence of still images during respective series of raster scans and cross-dissolving in respective series of steps from one of the still images of each pair to the next, one step per raster scan, thereby to generate said first component video signal; and
    means responsive to said other still images for generating said second component video signal.

2. Apparatus as set forth in claim 1 wherein each said first sequence of still images is descriptive of at least one foreground object and each other still image is descriptive of a background for each said foreground object, against which background said one foreground object moves, and wherein said first mixer selects the portions of said first component video signal descriptive of said at least one foreground object for said montage video signal and otherwise selects said second component video signal for said montage video signal.

3. Apparatus as set forth in claim 1 wherein each other still image is descriptive of at least one foreground object and each said first sequence of still images is descriptive of a moving background for each said foreground object; and wherein said first mixer selects. the portions of said second component video signal descriptive of said at least one foreground object for said montage video signal and otherwise selects said first component video signal for said montage video signal.

4. Apparatus as set forth in claim 1 wherein said first image processor comprises:
    a second mixer of cross-dissolver type, having first and second input ports, having an output port connected to the first input port of said first mixer and responding to a control signal to admix video signals applied to its first and second input ports to generate said first component video signal at its output port;
    means for respectively raster scanning each successive one of said first sequences of still images to supply the video signal applied to the first input port of said second mixer;
    means for repetitively raster scanning each successive one of said first sequences of still images with one raster scan frame delay respective to that used for supplying the video signal to the first input port of said second mixer, to supply the video signal applied to the second input of said second mixer; and
    a controller, for controlling the number of respective raster scans by both said means for repetitively raster scanning, and for generating the control signal applied to said second mixer.

5. Apparatus as set forth in claim 1 wherein said source of other still images supplies second sequences of related discontinuous still images; and wherein said means for generating said second component video signal comprises:
    a second image processor for generating said second component video signal responsive to said second sequences of still images, said second image processor consecutively considering successive pairs of each said second sequence of still images during respective series of raster scans and cross-dissolving in respective series of steps from one of the still images of each pair to the next, one step per raster scan, thereby to generate said second component video signal.

6. Apparatus as set forth in claim 5 wherein each said first sequence of still images is descriptive of at least one foreground object; wherein each said second sequence of still images is descriptive of a background for each said foreground object; and wherein said first mixer selects the portions of said first component video signal descriptive of said at least one foreground object for said montage video signal, and otherwise selects said second component video signal for said montage video signal.

7. Apparatus as set forth in claim 5 wherein said first image processor comprises:
- a second mixer of cross-dissolver type, having first and second input ports, having an output port connected to the first input port of said first mixer and responding to a control signal to admix video signals applied to its first and second input ports to generate said first component video signal at its output port;
- means for respectively raster scanning each successive one of said first sequences of still images to supply the video signal applied to the first input port of said second mixer;
- means for repetitively raster scanning each successive one of said first sequences of still images with one raster scan frame delay respective to that used for supplying the video signal to the first input port of said second mixer, to supply the video signal applied to the second input of said second mixer; and
- a controller, for controlling the number of respective raster scans by both said means for repetitively raster scanning each successive one of said first sequences of still images, and for generating the control signal applied to said second mixer.

8. Apparatus as set forth in claim 7 wherein said second image processor comprises:
- a third mixer of cross-dissolver type, having first and second input ports, having an output port connected to the second input port of said first mixer and responding to a control signal to admix video signals applied to its first and second input ports to generate said second component video signal at its output port;
- means for repetitively raster scanning each successive one of said second sequences of still images to supply the video signal applied to the first input port of said third mixer;
- means for repetitively raster scanning each successive one of said second sequences of still images with one raster scan frame delay respective to that used for supplying the video signal to the first input port of said third mixer, to supply the video signal applied to the second input of said third mixer; and
- a controller, for controlling the number of repetitive raster scans by both said means for repetitively raster scanning each successive one of said second sequence of still images, and for generating the control signal applied to said third mixer.

9. Apparatus for generating a montage video signal providing an illusion of continuous motion from sequences of related discontinuous motion from apparatus comprising:
- means for supplying first sequences of related discontinuous still images descriptive of foreground objects, each successive image of said first sequences being repetitively raster scanned;
- means for supplying said first sequences of related discontinuous still images delayed by one frame time, each delayed successive image of said first sequences being repetitively raster scanned;
- means for supplying second sequences of related discontinuous still images descriptive of background for said foreground objects, each successive image of said second sequences being repetitively raster scanned;
- means for supplying said second sequences of related discontinuous still images delayed by one frame time, each delayed successive image of said second sequences being repetitively raster scanned;
- a first video processor responsive to said first sequences of still images for generating a first component video signal;
- a second video signal processor responsive to said second sequences of still images for generating a second component video signal;
- a first mixer generating a first component montage video signal at an output port thereof, receptive of said first component video signal at one input port thereof and of said second component video signal at another input port thereof, said first mixer selecting portions of said first component video signal descriptive of foreground objects for said first component montage video signal and otherwise selecting said second component video signal;
- a third video processor responsive to said delayed first sequences of still images for generating a third component video signal;
- a fourth video processor responsive to delayed said second sequences of still images for generating a fourth component video signal;
- a second mixer generating a second component montage video signal at an output port thereof, receptive of said third component video signal at one input port thereof and of said fourth component video signal at another input port thereof, said second mixer selecting portions of said third component video signal descriptive of foreground objects for said second component montage video signal, and otherwise selecting said fourth component video signal;
- a third mixer having a first input port receptive of said first component montage video signal, having a second input port receptive of said second component montage video signal, and having an output port at which said montage video signal is generated by admixing said first and second component montage video signals in proportions determined from a control signal; and
- a controller for controlling the number of repetitive raster scannings of said still images in said first sequences and in said delayed first sequences, for controlling the number of still images in said second sequences and in said delayed second sequences, and for generating said control signal.

10. A method for generating montage video signals descriptive of moving images, said method comprising the steps of:
- storing most-current frames of background video signal data and repeatedly retrieving each successive one of them from storage in accordance with a prescribed scanning pattern to generate a first video signal;
- storing most-current and next-to-most-current frames of foreground video signal and repeatedly retrieving them from storage in accordance with a prescribed scanning pattern;

synchronizing the retrievals from storage of said background video signal data and said foreground video signal data, for determining relative positions of background and foreground video signal data in said montage video signals;

cross-disolving from the next-to-most-current frames of foreground video signal data to the most-current frame of foreground video signal data during the course of repeatedly retrieving them from storage, for generating a second video signal; and during each set of synchronized retrievals from storage, replacing the first video signal with second video signal descriptive of foreground video signal data superposed over background video signal data, in a mixing process for generating said montage video signal.

11. A method for generating montage video signals descriptive of moving images, said method comprising the steps of:

storing most-current and next-to-most-current frames of background video signal data and repeatedly retrieving them from storage in accordance with a prescribed scanning pattern;

storing most-current frames of foreground video signal data and repeatedly retrieving each successive one of them from storage in accordance with a prescribed scanning pattern to generate a first video signal;

synchronizing the retrievals from storage of said background video signal data and said foreground video signal data, for determining relative positions of background and foreground video signaal data in said montage video signals;

cross-dissolving from the next-to-most-current frame of background video signal data to the most-current frame of background video signal data during the course of repeatedly retrieving them from storage, for generating a second video signal; and during each set of synchronized retrievals from storage, replacing the second video signal with first video signal descriptive of foreground video signal data to be superposed over background video signal data, in a mixing process for generating said montage video signal.

12. A method for generating montage video signals descriptive of moving images, said method comprising the steps of:

storing most-current and next-to-most-current frames of background video signal data and repeatedly retrieving them from storage in accordance with a prescribed scanning pattern;

storing most-current and next-to-most-current frames of foreground video signal data and repeatedly retrieving them from storage in accordance with a prescribed scanning pattern;

synchronizing the retrievals from storage of said background video signal data and said foreground video signal data, for determining relative positions of background and foreground video signal data in said montage video signals;

cross-dissolving from the next-to-most-current frame of background video signal data to the most-current frame of background video signal data during the course of repeatedly retrieving them from storage, for generating a first video signal;

cross-dissolving from the next-to-most-current frames of foreground video signal data to the most-current frame of background video signal data during the course of repeatedly retrieving them from storage, for generating a second video signal; and during each set of synchronized retrievals from storage, replacing the first video signal with second video signal descriptive of foreground data to be superposed over background data, in a mixing process for generating said montage video signal.

* * * * *

UNITED STATES PATENT AND TRADEMARK OFFICE
CERTIFICATE OF CORRECTION

PATENT NO. :  4,698,682

DATED       :  October 6, 1987

INVENTOR(S) :  Brian Astle

It is certified that error appears in the above-identified patent and that said Letters Patent is hereby corrected as shown below:

Column 1, line 15, should read "pictures" reads "pitures"
Column 1, line 30, should read "continuing" reads "continuning"
Column 2, line 48, should read Asteroids" reads "Asteriods"
Column 5, line 28, should read "odd" reads "off"
Column 6, line 23, should read "times." reads "times"
Column 7, line 46, should read "is" reads "it"
Column 9, line 63 , should read "Apparatus for generating a montage video signal providing an illusion of continuous motion from sequences of related discontinuous still images, said apparatus comprising:"
Column 11, line 36, should read "signal" reads "signaal"

On the Abstract Sheet

References cited U.S. Patent Documents should read
"4,130,830 12/1978 Derickson"  reads "4,130,830 12/1978 Dericksoon"

Signed and Sealed this

Sixth Day of September, 1988

Attest:

DONALD J. QUIGG

*Attesting Officer*      *Commissioner of Patents and Trademarks*